June 2, 1970     A. THEER ET AL     3,515,473

MOVIE CAMERA

Filed July 14, 1966     2 Sheets-Sheet 1

INVENTOR.
ANTON THEER
JOHANN ZANNER
BY

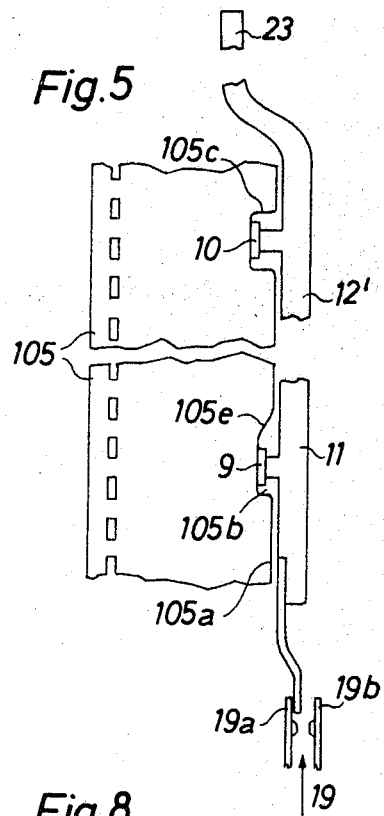
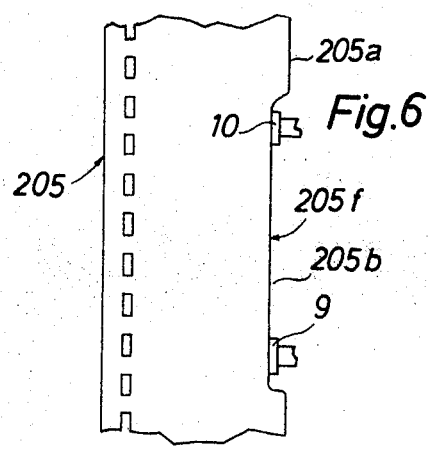
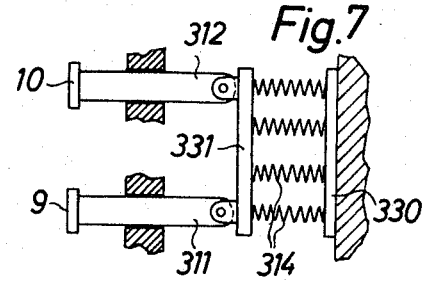
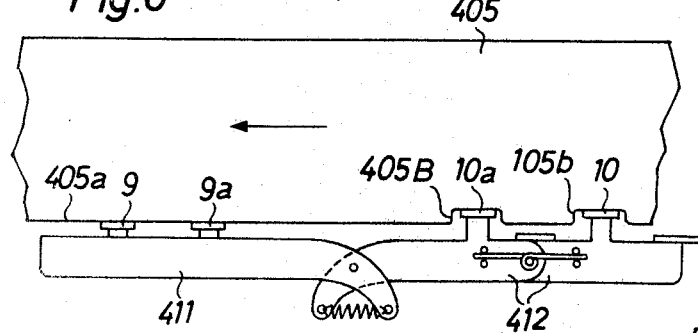
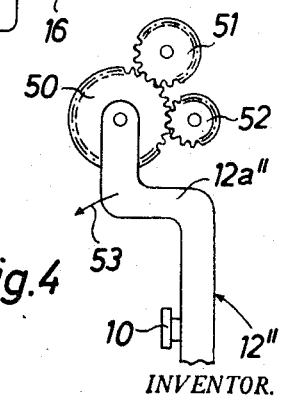
INVENTOR.
ANTON THEER
JOHANN ZANNER

United States Patent Office 3,515,473
Patented June 2, 1970

---

3,515,473
MOVIE CAMERA
Anton Theer, Munich, and Johann Zanner, Unterhaching, Munich, Germany, assignors to Agfa-Gevaert Aktiengesellschaft, Leverkusen, Germany
Filed July 14, 1966, Ser. No. 565,122
Claims priority, application Germany, July 21, 1965,
A 24,095
Int. Cl. G03b 1/50
U.S. Cl. 352—224                                13 Claims

---

ABSTRACT OF THE DISCLOSURE

A motion picture camera wherein one edge portion of the film is biased against a fixed guide extending along one side of the film gate. Such biasing action is produced by a pair of presser members which are mounted on pivotable levers and bear against the other edge portion of the film opposite the fixed guide. One or more springs urge the presser members against the other edge face of the film with the same force. At least one of the presser members may enter a notch at the trailing end of the film to thereby arrest the motor of the camera or to produce a signal which indicates that the supply of unexposed film is exhausted.

---

The present invention relates to movie cameras in general, and more particularly to improvements in devices and assemblies for guiding the film past the aperture of the film gate in a movie camera.

It is already known to provide a movie camera with guide means for holding successive increments or frames of the film against undesirable movement during advance past the aperture of the film gate. A serious drawback of presently known guide means of which we are aware at this time is that they subject the film to uneven stresses which often result in damage to the film or cause the film to run askew.

Accordingly, it is an important object of the present invention to provide a movie camera with very simple, compact, inexpensive but highly reliable guide means whose components are capable of insuring accurately controlled movement of successive unexposed film frames past the aperture of the film gate without any danger of damage to the film and/or misalignment of film frames with reference to the gate.

Another object of the invention is to provide a movie camera which embodies the just outlined guide means for movie film and wherein such guide means can also perform one or more additional and highly advantageous functions, particularly the function of producing one or more visual or otherwise detectable signals as soon as the supply of unexposed film in the camera is or is about to be expended.

A further object of the invention is to provide a movie camera wherein the transmission of motion from a motor to the claw pull-down of the film transporting mechanism can be interrupted in a novel way and in automatic response to detection by the improved guide means that the supply of unexposed film has run out.

An additional object of the invention is to provide novel and improved guide means for movie film and to construct such guide means with a view to facilitate their incorporation in presently known movie cameras without necessitating any major alterations in the design or dimensions of such cameras.

A concomitant object of the present invention is to provide a movie camera which embodies the above outlined guide means and which can be utilized with customary movie film as well as with special types of movie film wherein the trailing end of the film is provided with one or more recesses or notches serving as a means for initiating the generation of signals which indicate to the user that the trailing end of the film is approaching the film gate.

Briefly stated, one feature of our present invention resides in the provision of a movie camera comprising a film gate having an aperture along which successive unexposed frames of the movie film travel when the camera is in actual use and when the film is transported by a suitable transporting mechanism including a spring motor or an electric motor and a suitable claw pull-down which receives motion from the motor, first guide means adjacent to one side of the aperture in the film gate and also adjacent to one longitudinal edge portion of the movie film when the latter is properly threaded into the camera, and second guide means for urging the one edge portion of the movie film against the first guide means. The second guide means comprises a plurality of relatively movable presser members engaging the other longitudinal edge portion of the movie film opposite the first guide means, and biasing means for urging each of the presser members against the other edge portion with an at least nearly identical force. The second guide means further comprises at least two carriers each of which supports at least one presser member and each of which is movable with reference to the other carrier. Such carriers can be constituted by two-armed levers or by slides.

In accordance with another feature of our invention, the improved guide means are preferably embodied in a movie camera utilizing movie film of the type whose other longitudinal edge portion is provided with at least one recess or notch adjacent to the trailing end of the film. The camera then further comprises at least one signal generating device which is operatively connected with the second guide means and produces a visible or otherwise detectable signal when at least one of the presser members enters the notch. For example, such signal generating device may include a clutch in the motion transmitting connection between a spring motor and the claw pull-down whereby the clutch prevents further transmission of motion when a given presser member enters the notch of the movie film to thereby indicate to the operator that the supply of unexposed film is about to run out or has actually run out. Alternatively, the signal generating device may comprise a normally closed control switch in the circuit of an electric motor which drives the claw pull-down and a trip or the like which opens the control switch in response to entry of at least one presser member into the notch at the trailing end of the movie film.

The novel features which are considered as characteristic of the invention are set forth in particular in the appended claims. The improved movie camera itself, however, both as to its construction and its mode of operation, together with additional features and advantages thereof, will be best understood upon perusal of the following description of certain specific embodiments with reference to the accompanying drawings, in which:

FIG. 4 illustrates certain details of a third movie camera wherein the signal generating device is arranged to interrupt a gear train between a spring motor and the claw pull-down of the film transporting mechanism;

FIG. 5 shows certain details of a fourth movie camera which utilizes film of the type having two recesses near its trailing end and wherein the signal generating device can produce two different signals;

FIG. 6 illustrates certain deails of a fifth movie camera which utilizes movie film having a recess long enough to accommodate two presser members at the same time;

FIG. 7 shows certain details of a sixth movie camera wherein the presser members are mounted on reciprocable carriers and wherein the means for biasing the presser members with the same force comprises a plurality of springs; and FIG. 8 illustrates certain details of an additional movie camera wherein each carrier supports a plurality of presser members.

Figure 1:
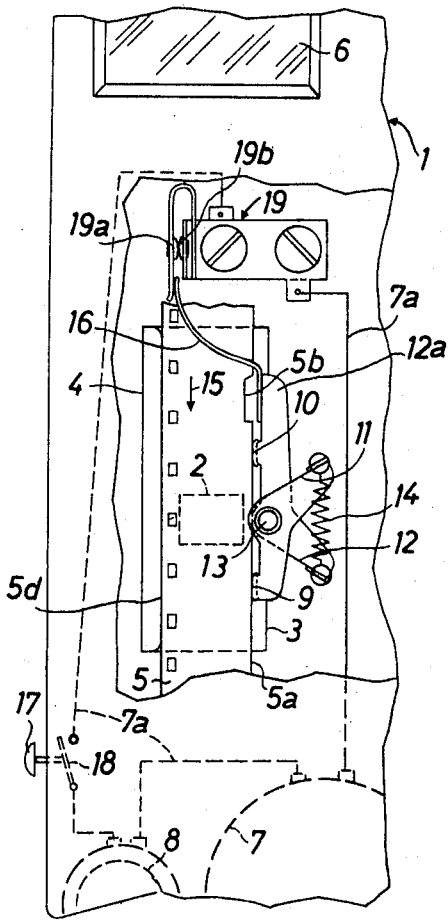
FIG. 1 is a schematic fragmentary front elevational view of a movie camera which embodies one form of our invention and wherein the film is shown in a position it assumes shortly before a recess or notch in one of its edge portions causes the signal generating device to arrest the film transporting mechanism.
Figure 2:
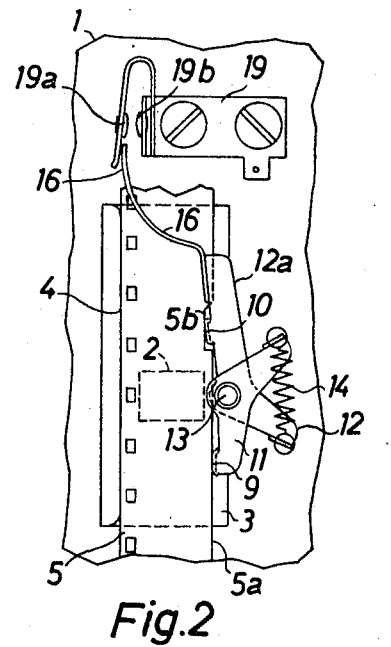
FIG. 2 illustrates the structure of FIG. 1 but with the signal generating device in operative position.

Referring first to FIGS. 1 and 2, there is shown a portion of a movie camera which comprises a housing 1 having a film gate 3 provided with an aperture 2 and located behind a vertically extending first guide member 4 for the left-hand edge portion 5d of the film 5. The gate 3 is located at a level below a view finder 6 and the film 5 is advanced intermittently by a suitable transporting mechanism which preferably includes a claw pull-down (not shown) and an electric motor 7 connected in circuit with a source of electrical energy here shown as a battery 8.

In accordance with our present invention, the camera also comprises a composite second guide member including two relatively movable presser members 9 and 10 which engage the right-hand edge portion 5a of the film 5 and urge the edge portion 5d flush against the first guide member 4. The presser members 9, 10 are respectively provided on one arm of each of two carriers in the form of bell crank levers 11, 12 which are preferably rockable about a common pivot pin 13 and whose free arms are coupled to each other by a resilient element in the form of a helical contraction spring 14 serving as a means for biasing the presser members 9, 10 against the edge portion 5a with an identical force. The two carriers or levers 11, 12 form with the spring 14 and pivot pin 13 a substantially scissor-shaped guide member which urges each of its presser members 9, 10 against the edge portion 5a with the same force so that the edge portion 5d is in full face-to-face abutment with the entire first guide member 4 and the film remains in an optimum position with reference to the aperture 2. This distinguishes our movie camera from certain conventional movie cameras which also comprise two presser members but wherein each presser member is biased with a different force so that the film is likely to run askew.

The presser members 10 and 9 are respectively located up stream and downstream of the window 2, as viewed in the direction of the arrow 15, so that the pressing forces exerted by such pressing members act upon two sections of the edge portion 5a which can be said to be mirror symmetrical with reference to a horizontal plane passing midway across the window 2 and preferably including the axis of the pin 13.

The arm of the lever 12 which carries the first presser member 10 (namely, the presser member which is first to come in actual contact with any given length of the edge portion 5a) is provided with an extension 12a for a motion transmitting element in the form of a suitably bent leaf spring 16 serving as a trip for opening a normally closed control switch 19. This switch 19 includes a fixed contact 19b and a movable contact 19a which latter is moved away from the contact 19b when the lever 12 moves from the angular position of FIG. 1 to that of FIG. 2. Such angular movement of the lever 12 is possible when the presser member 10 enters a notch or recess 5b in the edge portion 5a of the film 5, the notch 5b being provided close to the trailing end of the film and being intended to effect the generation of a visible or otherwise detectable signal to insure that the operator knows that the film has run out and that the supply of film in the camera must be renewed. The length of the notch 5b is sufficient to allow for entry of the presser member 10 so that the lever 12 is definitely rocked by the spring 14 and the leaf spring 16 opens the control switch 19. The arrow 15 indicates the direction in which the film 5 is driven by the transporting mechanism including the motor 7. The circuit of this motor further includes a normally open master switch 18 which can be closed by a manually operated trip in the form of a pushbutton 17. The customary supply spool or reel (not shown) is located at a level above and the take-up spool is located at a level below the gate 3. However, the present invention can be embodied with equal advantage in cameras wherein the supply and take-up spools are rotatable about a common axis. The trip 16 and the control switch 19 can be said to constitute a signal generating device which is effective in response to entry of the presser member 10 into the notch 5b and then produces what can be called a negative signal in that it prevents further operation of the film transporting mechanism by opening the circuit of the motor 7.

The conductor means which connect the motor 7 with the battery 8 and with one contact of the control switch 19, and the conductor means which connect the master switch 18 with the battery and with the other contact of the control switch 19 are indicated by the reference numeral 7a. The control switch 19 remains closed as long as the presser member 10 abuts against the edge portion 5a of the film 5. Thus, the circuit of the motor 7 and battery 8 cannot be completed when the film is removed from the housing 1 so that there is no danger of wasting electrical energy when the camera is not ready to make exposures. Also, the operator immediately knows that the supply of unexposed film has run out if he depresses the pushbutton 17 and fails to start the motor 7. In other words, the provision of the control switch 19 constitutes a dual safety measure and the operation of this switch is controlled by the film proper so that there is no possibility of making exposures when the supply of unexposed film has been expended. It will be noted that the electric circuit of the movie camera shown in FIGS. 1 and 2 is a simple series circuit.

Figure 3:
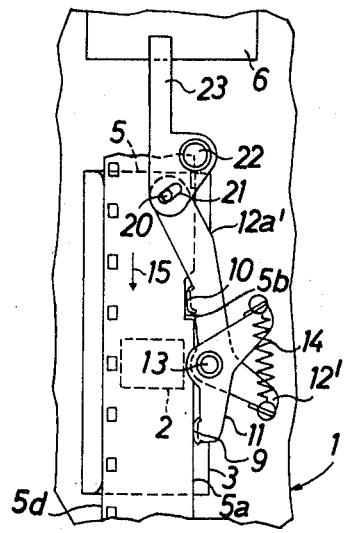
FIG. 3 is a fragmentary diagrammatic front elevational view of a modified movie camera wherein the signal generating device is utilized to produce a visible signal which warns the user that the supply of unexposed film is about to run out.

The present invention can be embodied with equal advantage in movie cameras wherein the film is transported by a unit including a spring motor. For example, and as shown in FIG. 4, the extension 12a″ of the lever 12″ can carry a gear 50 or another element of a suitable clutch or transmission installed in the power train between the spring motor and the claw pull-down, and such gear 50 or clutch element is disengaged from one or more additional gears 51, 52 of a gear train for the claw pull-down in automatic response to entry of the presser member 10 into the notch 5b (arrow 53). Instead of or in addition to the just described function of the lever 12″ shown in FIG. 4, and instead of or in addition to the function of the lever 12 shown in FIGS. 1 and 2, the lever 12 or 12″ can also serve as a means for operating a signal generating device for visually indicating to the user that the supply of unexposed film has run out. This embodiment of our invention is illustrated in FIG. 3 wherein the carrier or lever 12′ comprises an extension 12a′ provided with an elongated cam slot 21 for a follower pin 20 which is affixed to one arm of a two-armed index or marker 23 rockable about a fixed pivot pin 22. The remaining parts of the structure shown in FIG. 3 are identical with the corresponding parts of the movie camera shown in FIGS. 1 and 2.

When the presser member 10 is free to enter the notch 5b, the extension 12a′ of the lever 12′ rocks the index 23 through the intermediary of the pin-and-slot connection 20, 21 so that the other arm of the index 23 enters the field of view defined by the view finder 6. Thus, the user immediately notes that the camera requires a fresh supply of movie film because the user is looking through the view finder 6 when the camera is in actual use. The connection 20, 21 automatically removes the index 23 from the field of view when the presser member 10 abuts against the edge portion 5a. It will be readily understood that the index 23 may be moved into and from registry with a separate window (not shown) which can be provided therefor in the housing 1, or that the camera may be equipped with a suitable prism or the like to deflect the image of the index 23 into the view finder 6 when the presser member 10 enters the notch 5b. All such modifications will be readily understood upon perusal of the preceding disclosure.

The improved movie camera can be modified still further if the edge portion 105a of a movie film 105 is provided with two recesses or notches 105b, 105c configurated and positioned with reference to each other as shown in FIG. 5. At least the outlet end of the leading notch 105b is bounded by an inclined surface 105e so that the presser member 10 can slide along such inclined surface 105e to first enter and to thereupon leave the notch 105b. Rocking of the lever 12' in response to entry of the presser member 10 into the notch 105b can result in movement of an index 23 to the position shown in FIG. 3 or 4 so that the user of the movie camera is warned that the supply of unexposed film is about to expire. The control switch 19 can be opened by the lever 11 in response to entry of the presser member 9 into the notch 105b while the presser member 10 enters the notch 105c. Alternatively, the depth of the notch 105b may be less than that of the notch 105c so that the presser member 10 will move the index 23 to operative position of FIG. 3 when the presser member 10 enters the notch 105b and that the same presser member 10 will open the control switch 19 when it enters the deeper notch 105c.

FIG. 6 illustrates a portion of a further film 205 whose edge portion 205a is provided with a relatively long recess or notch 205b. The length of this notch 205b is such that it can accommodate both presser members 9, 10 at the same time. The first presser member 10 then moves the index 23 to operative position which is shown in FIG. 3 as soon as it enters the leading end of the notch 205b. The control switch 19 is opened in response to entry of the second presser member 9 into the notch 205b. An important advantage of the just described embodiment is that the pressure members 9, 10 subject the film 205 to identical stresses even at such times when they extend into the notch 205b and bear against the film surface 205f bounding the bottom zone or deepmost zone of the notch.

It is further clear that the levers 11, 12 or 12' can be replaced by carriers in the form of slides which are biased by one or more springs. This is shown in FIG. 7 wherein the presser members 9, 10 are respectively mounted on slides 311, 312 which are biased by a set of springs 314 operating between a fixed retainer 330 and a crosshead 331 which is articulately connected with the trailing ends of the slides 311, 312.

Finally, and as shown in FIG. 8, at least one of the levers 411, 412 can carry a plurality of presser members such as the presser members 9, 9a and 10, 10a. The edge portion 405a of the movie film 405 is then provided with a plurality of notches 405b, 405B, one for each of the presser members 10, 10a. The distance between the notches 405b, 405B is the same as that between the presser members 10, 10a so that the control switch 19 (not shown in FIG. 7) will be opened by the leaf spring 16 only when the presser members 10, 10a respectively enter the notches 405b, 405B.

Without further analysis, the foregoing will so fully reveal the gist of the present invention that others can, by applying current knowledge, readily adapt it for various applications without omitting features which fairly constitute essential characteristics of the generic or specific aspects of our contribution to the art.

What is claimed as new and desired to be protected by Letters Patent is:

1. In a movie camera, a film gate having an aperture along which successive unexposed frames of the film travel when the camera is in use; first guide means adjacent to one side of the aperture and to one longitudinal edge portion of the film; and second guide means for urging said one edge portion against said first guide means, said second guide means comprising a plurality of presser members engaging the other longitudinal edge portion of the film opposite said first guide means, and biasing means for urging each of said presser members against said other edge portion of the film with an at least nearly identical force, said second guide means further comprising a pair of levers rockable about pivoting means and said presser members including at least one presser member on each of said levers, said biasing means comprising a common resilient means connecting said levers and arranged to urge said levers in directions to bias the presser member on said levers with substantially the same force against the other edge portion of the film.

2. A structure as set forth in claim 1, wherein said presser members include a first presser member located upstream and a second presser member located downstream of said aperture, as seen in the direction of travel of unexposed film frames.

3. A structure as set forth in claim 2, wherein said first and second presser members are substantially mirror symmetrical with reference to a transverse plane extending midway across said aperture.

4. A structure as set forth in claim 1, wherein each of said levers is a two-armed lever the first arm of which supports at least one of said presser members, said resilient means comprising spring mean coupling the second arms of said levers and arranged to urge said first arms toward each other.

5. A structure as set forth in claim 1 for use in connection with film of the type having at least one recess provided in said other edge portion thereof and adjacent to the trailing end of the film, wherein at least one of said presser members is receivable in said recess and further comprising signal generating means arranged to produce a detectable signal in response to entry of said one presser member into said recess to thus inform the user of the camera that the supply of unexposed film is at least nearly exhausted.

6. A structure as set forth in claim 5, further comprising film transporting means operative to transport successive unexposed film frames past said aperture, said signal generating means comprising means for preventing the operation of said film transporting means on entry of said one presser member into said recess.

7. A structure as set forth in claim 6, wherein said film transporting means comprises electric motor means and a source of electrical energy connected in circuit with said motor means, said signal generating means comprising normally closed control switch means connected in said circuit and trip means operatively connected with said second guide means and arranged to open said control switch means and to thus deenergize said circuit in response to entry of said one presser member into said recess.

8. A structure as set forth in claim 6, wherein said film transporting means comprises a plurality of normally cooperating clutch elements and said signal generating means comprises means for disengaging one of said clutch elements from at least one other clutch element in response to entry of said one presser member into said recess.

9. A structure as set forth in claim 5, wherein the length of said recess is sufficient to accommodate two of said presser members at a time including said one presser member, said signal generating means being arranged to produce a signal in response to entry of said two presser members into said recess.

10. A structure as set forth in claim 5, wherein said other edge portion is provided with a pluariality of longitudinally spaced recesses and wherein each of said recesses accommodates a presser member when said signal generating means produces a signal.

11. In a movie camera for use in connection with movie film of the type having a first longitudinal edge portion, a second longitudinal edge portion and at least one recess provided in said second edge portion adjacent to the trailing end thereof, a film gate having an aperture along which successive unexposed frames of the film travel when the camera is in use; first guide means adjacent to one side of said aperture and to said first longitudinal edge portion of the film; second guide means for urging said first edge portion against said first guide means, said second guide means comprising a plurality of presser members engaging said second longitudinal edge portion of the film opposite said first guide means, and biasing means for urging each of said presser members against said second edge portion of the film with an at least nearly identical force, at least one of said presser members being receivable in said recess and said second guide means further comprising a movable carrier supportingly connected with said one presser member, said biasing means comprising resilient means for urging said one presser member against said second edge portion through the intermediary of said carrier; signal generating means arranged to produce a detectable signal in response to entry of said one presser member into said recess to thus inform the user of the camera that the supply of unexposed film is at least nearly exhausted; and a window defining a field of view, said signal generating means comprising index means normally located outside of said field of view and arranged to enter such field in response to entry of said one presser member into said recess, and a pin-and-slot connection between said carrier and said index means.

12. A structure as set forth in claim 11, wherein said index means comprises a two-armed lever rockable about a fixed axis and having a first and a second arm, one of said arms being movable into and from said field of view and the other of said arms being coupled with said carrier by said pin-and-slot connection.

13. In a movie camera for use in connection with movie film of the type having a first longitudinal edge portion, a second longitudinal edge portion and at least one recess provided in said second edge portion adjacent to the trailing end thereof, a film gate having an aperture along which successive unexposed frames of the film travel when the camera is in use; first guide means adjacent to one side of the aperture and to said first longitudinal edge portion of the film, second guide means for urging said first edge portion against said first guide means, said second guide means comprising a plurality of presser members engaging said second longitudinal edge portion of the film opposite said first guide means, a pair of relatively movable carriers each supporting a presser member and biasing means including resilient means operatively connected with said carriers for urging each of said presser members against said second edge portion of the film with an at least nearly identical force, at least one of said presser members being receivable in said recess; signal generating means arranged to produce a detectable signal in response to entry of said one presser member into said recess to thus inform the user of the camera that the supply of unexposed film is at least nearly exhausted; and film transporting means operative to transport successive unexposed film frames past said aperture, said signal generating means comprising means for preventing the operation of said film transporting means on entry of said one presser member into said recess, said one presser member being first to engage successive sections of said second edge portion when the film is advanced by said transporting means so that said one presser member is also the first to enter said recess.

References Cited

UNITED STATES PATENTS

| | | | |
|---|---|---|---|
| 1,120,577 | 12/1914 | Wiese | 352—92 X |
| 1,404,773 | 1/1922 | Hunt | 352—224 X |
| 2,011,272 | 8/1935 | Duggan | 352—92 X |
| 2,148,076 | 2/1939 | Kirkman | 352—171 |
| 2,269,952 | 1/1942 | Morgan | 352—92 |
| 3,136,209 | 6/1964 | Briskin | 352—224 X |
| 3,439,980 | 4/1969 | Teshie | 352—79 |

FOREIGN PATENTS

| | | |
|---|---|---|
| 601,235 | 11/1925 | France. |
| 410,519 | 3/1925 | Germany. |
| 119,131 | 6/1947 | Sweden. |

NORTON ANSHER, Primary Examiner

M. H. HAYES, Assistant Examiner

U.S. Cl. X.R.

352—92, 171, 236